(12) United States Patent
Ji

(10) Patent No.: US 8,402,862 B2
(45) Date of Patent: Mar. 26, 2013

(54) WIRE STRIPPER

(76) Inventor: Sung Hoon Ji, Incheon (KR)

( * ) Notice: Subject to any disclaimer, the term of this patent is extended or adjusted under 35 U.S.C. 154(b) by 214 days.

(21) Appl. No.: 12/907,395

(22) Filed: Oct. 19, 2010

(65) Prior Publication Data

US 2011/0094343 A1     Apr. 28, 2011

(30) Foreign Application Priority Data

Oct. 26, 2009  (KR) ................ 10-2009-0101686

(51) Int. Cl.
*H02G 1/12* (2006.01)
(52) U.S. Cl. ......................... 81/9.51; 81/9.42
(58) Field of Classification Search ............ 81/9.4, 81/9.51, 9.41–9.44; 30/90.1
See application file for complete search history.

(56) References Cited

U.S. PATENT DOCUMENTS

| | | | | |
|---|---|---|---|---|
| 4,019,409 A | * | 4/1977 | McKeever | 81/9.51 |
| 4,981,054 A | * | 1/1991 | Stepan | 81/9.51 |
| 4,987,801 A | * | 1/1991 | Brown | 81/9.4 |
| 5,111,720 A | * | 5/1992 | Stepan | 81/9.51 |
| 5,669,276 A | * | 9/1997 | Spacek | 82/128 |
| 5,673,486 A | * | 10/1997 | Brown | 30/90.1 |
| 6,079,297 A | * | 6/2000 | Chandler et al. | 81/9.51 |
| 7,025,239 B2 | * | 4/2006 | Itano et al. | 225/95 |

FOREIGN PATENT DOCUMENTS

JP       1997-224316 A     8/1997

* cited by examiner

*Primary Examiner* — David B Thomas
(74) *Attorney, Agent, or Firm* — Ladas & Parry LLP

(57) ABSTRACT

Provided is a wire stripper, and more particularly to an apparatus for easily removing a sheath of a metal wire. The wire stripper effectively and quickly removes the sheath, wherein a sheath of only a required region of the wire is removed.

6 Claims, 2 Drawing Sheets

WIRE STRIPPER

CROSS-REFERENCE TO RELATED PATENT APPLICATION

This application claims the benefit of Korean Patent Application No. 10-2009-0101686, filed on Oct. 26, 2009, in the Korean Intellectual Property Office, the disclosure of which is incorporated herein in its entirety by reference.

BACKGROUND OF THE INVENTION

1. Field of the Invention

The present invention relates to a wire stripper, and more particularly, to an apparatus for easily removing a sheath of a metal wire.

2. Description of the Related Art

Generally, in order to prevent an electric shock, a wire is covered with a synthetic resin sheath or a sheath coated with enamel or other paint. When such a wire is to be connected to a terminal or another wire, a sheath of the wire is peeled off so that a metal, such as copper, is externally exposed, and the exposed metal is connected to the terminal, or the like. As such, the wire is connected to the terminal or the other wire after peeling off the sheath of the wire.

Specifically, a cable for power transmission is formed by binding up tens to hundreds of strands of wire sheathed with enamel coating and sheathing the bound tens to hundreds of strands of wire with a synthetic resin. In order to connect the two cables for power transmission to each other, sheaths of all strands of wire are peeled off, and the cables are connected and bound to each other by using a hydraulic system while the cables face each other.

Conventionally, the sheaths of the cable were manually peeled off, i.e., a person peeled off the sheaths of tens to hundreds of strands of wire one by one with a knife. Thus, operation efficiency was remarkably low, and the sheaths were not effectively peeled off. For example, a residue may be left since the sheath is not clearly peeled off, or a metal may be peeled off together with the sheath.

Accordingly, in order to easily peel off the sheaths, the sheaths were removed by using chemicals. However, installing and connecting operations of the cables for power transmission are generally performed in a small space underground, and a toxic gas may be generated due to the chemicals. Also, a liquid chemical may flow and peel off a sheath more than required.

SUMMARY OF THE INVENTION

The present invention provides an apparatus for rapidly performing an operation of removing a sheath of a wire.

According to an aspect of the present invention, there is provided a wire stripper for peeling off a sheath of a wire, the wire stripper including: a main shaft; a rotating unit for rotating the main shaft; a cutting member including a lever that is disposed parallel to the main shaft and is hinged to the main shaft so as to rotate with respect to a hinge shaft perpendicular to the main shaft, a cutter that is combined to the lever in such a way that the cutter peels off the sheath of the wire collinearly disposed with the main shaft while the main shaft is rotated, and a weight combined to the lever so that a location opposite to where the cutter is located with respect to a rotating axis of the lever is heavier; and a housing including an inserting hole through which the wire is inserted and guided to the cutter of the cutting member, and accommodating the cutting member and at least a part of the main shaft.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
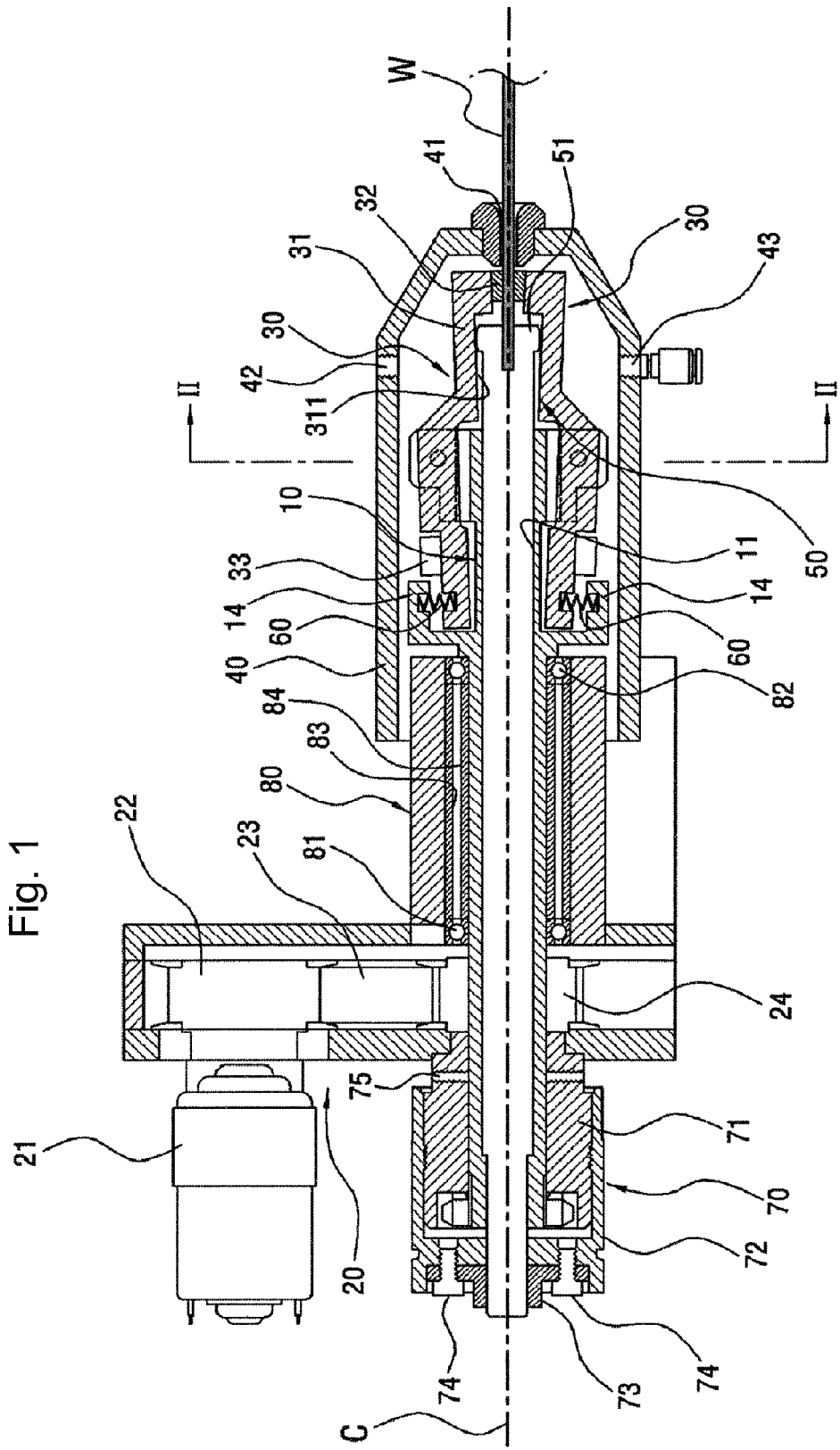
FIG. 1 is a cross-sectional view of a wire stripper according to an embodiment of the present invention.
Figure 2:
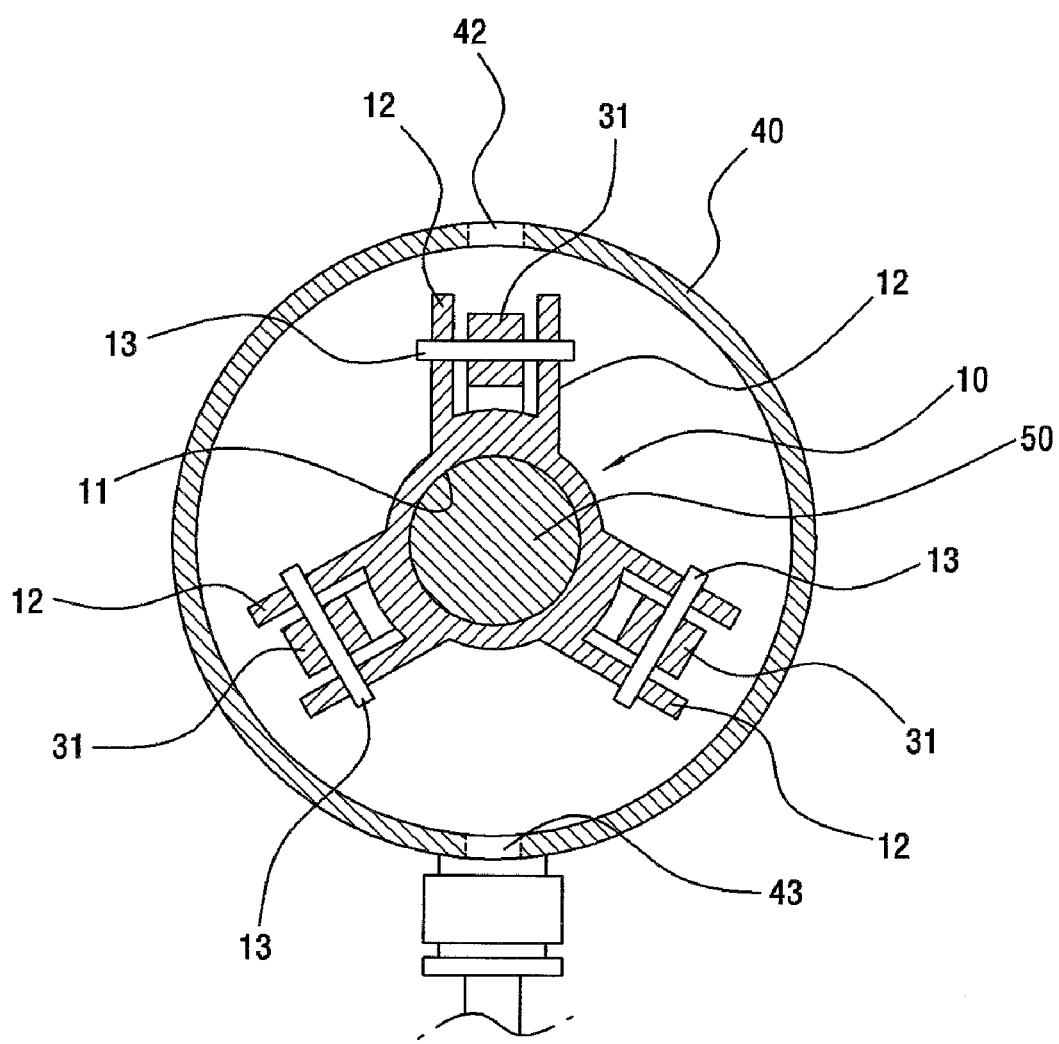
FIG. 2 is a cross-sectional view taken along a line II-II of the wire stripper of FIG. 1.

FIG. 1 is a cross-sectional view of a wire stripper according to an embodiment of the present invention, and FIG. 2 is a cross-sectional view taken along a line II-II of the wire stripper of FIG. 1.

Referring to FIG. 1, the wire stripper according to the current embodiment of the present invention includes a main shaft 10, a rotating unit 20, a cutting member 30, and a housing 40.

The rotating unit 20 includes a motor 21, a driving pulley 22, a driven pulley 24, and a belt 23. The driving pulley 22 is combined to the motor 21 and is rotated by the motor 21. The driving pulley 22 and the driven pulley 24 are connected by the belt 23. The driven pulley 24 also rotates in association with the rotation of the driving pulley 22. The main shaft 10 is combined to the driven pulley 24, and rotates with the driven pulley 24. The driving pulley 22, the driven pulley 24, the belt 23, and the main shaft 10 are accommodated and installed in a holder 80.

Two bearings 81 and 82 are installed in the holder 80 along a length direction of the main shaft 10. Outer rings of the two bearings 81 and 82 are fit to the holder 80, and inner rings of the two bearings 81 and 82 are fit to the main shaft 10. An outer ring spacer 83 is disposed between the outer rings of each of the two bearings 81 and 82, and an inner ring spacer 84 is disposed between the inner rings of each of the two bearings 81 and 82. The outer and inner ring spacers 83 and 84 maintain a space between the two bearings 81 and 82, and support the two bearings 81 and 82 in a shaft direction.

Referring to FIGS. 1 and 2, the cutting member 30 is installed at the main shaft 10. A plurality of the cutting members 30 may be installed along a circumferential direction of the main shaft 10, and in the current embodiment of the present invention, three cutting members 30 are installed at the main shaft 10 at regular angle intervals of 120°. For reference, a region where the cutting member 30 is installed at the main shaft 10 in FIG. 1 is deliberately drawn horizontally symmetrical with respect to a central axis line C for convenience. Looking at the cross-sectional view of FIG. 2, an actual cross section below the central axis line C is different from FIG. 1.

The cutting member 30 includes a lever 31, a cutter 32, and a weight 33. The lever 31 has a stick shape. The lever 31 is disposed parallel to the main shaft 10 and is hinged to the main shaft 10 to be rotatable with respect to the main shaft 10. Referring to FIG. 2, three pairs of lever supporters 12 protrude from an outer surface of the main shaft 10. A hinge shaft 13 is installed at each pair of the lever supporters 12 in a direction perpendicular to an extending direction of the main shaft 10. The lever 31 is rotatably installed at each hinge shaft 13. As a result, each lever 31 is hinged to the main shaft 10 so that the lever 31 is rotatable with respect to the hinge shaft 13 that is perpendicular to the main shaft 10. The cutter 32 is combined to one end of the lever 31 so that sheath of a wire W is peeled off. A sheath removing performance may be improved by using the cutter 32 formed of an artificial diamond. The weight 33 is installed at a location of the lever 31 opposite to where the cutter 32 is located from on a rotating axis (the hinge shaft 13) of the lever 31. Accordingly, the location opposite to where the cutter 32 is located is heavier due to the weight 33 from the rotating axis of the lever 31. The weight 33 may be fixed to the lever 31 after being manufactured separately from the lever 31, or may be integrally formed with the lever 31 as one body. In the current embodiment of the present invention, the weight 33 is separately manufactured and combined to the lever 31 as shown in FIG. 1. An incline 311 is formed on an external surface of the lever 31 facing the central axis line C of the main shaft 10. The incline 311 limits a nearest distance of the cutter 32 to the wire W according to an interaction with a diameter adjuster 51 of a slide shaft 50 that will be described later.

An elastic member 60 is installed between the main shaft 10 and the cutting member 30, so as to provide an elastic force in a direction that the cutter 32 moves farther from a center shaft line C of the main shaft 10.

A ring 14 having a cylindrical shape is formed at the main shaft 10, and the elastic member 60 having a spring shape is formed on an inner wall of the ring 14. One end of the elastic member 60 is inserted into the inner wall of the ring 14 of the main shaft 10, and another end of the elastic member 60 is inserted into the lever 31 of the cutting member 30. The elastic member 60 is connected to the location of the lever 31 opposite to where the cutter 32 is located with respect to the hinge shaft 13, so that the elastic member 60 provides the elastic force with respect to the cutting member 30. According to the elastic force of the elastic member 60, the lever 31 slants in such a way that a region of the lever 31 where the weight 33 is installed is near to the main shaft 10 and a region of the lever 31 where the cutter 32 is installed is farther from the main shaft 10.

A through hole 11 penetrating the main shaft 10 in a length direction of the main shaft 10 is formed in the main shaft 10, and the slide shaft 50 is inserted into the through hole 11. The diameter adjuster 51 having a bump shape is formed at an end of the slide shaft 50. When the slide shaft 50 slides along the through hole 11 of the main shaft 10, the diameter adjuster 51 moves along the incline 311 of the lever 31 so as to limit a rotatable angle of the lever 31 with respect to the hinge shaft 13. In other words, the diameter adjuster 31 limits the nearest distance of the cutter 32 combined to the lever 31, to the central axis line C of the main shaft 10.

A relative location of the slide shaft 50 with respect to the main shaft 10 is adjusted by a diameter adjusting unit 70. The diameter adjusting unit 70 includes a fixed body 71 and a knob 72.

The fixed body 71 is combined to the main shaft 10, and a male screw is formed on an external diameter of the fixed body 71. The knob 72 has a cylindrical shape, and a female screw is formed on an internal diameter of the knob 72. Thus, the knob 72 is screwed to the male screw of the fixed body 71 and at the same time, combined to the slide shaft 50.

A location fixing nut 73 is inserted into the slide shaft 50 while the knob 72 is inserted into the slide shaft 50 to prevent a relative rotation, and is combined to the knob 72 by a bolt 74. Since the knob 72 is screwed to the fixed body 71, when the knob 72 is rotated, the slide shaft 50 rotates with respect to the main shaft 10 while moving forward or backward along the through hole 11 of the main shaft 10. As such, by moving the slide shaft 50 forward or backward with respect to the main shaft 10, a relative location between the diameter adjuster 51 and the incline 311 is adjusted, thereby adjusting a distance between the cutter 32 and the central axis line C. When adjusting of a location of the slide shaft 50 on the main shaft 10 is completed, a fixing bolt 75 installed to contact the slide shaft 50 after penetrating through the fixing body 71 and the main shaft 10 is fastened so that the slide shaft 50 does not relatively rotate with respect to the main shaft 10. When the location of the slide shaft 50 on the main shaft 10 needs to be adjusted, the fixing bolt 75 is unfastened and the knob 72 is rotated to adjust the location.

A part of the main shaft 10 and the cutting member 30 is accommodated in the housing 40 as shown in FIG. 1. The housing 40 is combined to the holder 80. An inserting hole 41 is formed on the housing 40, and the wire W is inserted into the inserting hole 41. The inserting hole 41 guides the wire W to the cutter 32 of the cutting member 30.

An air inlet hole 42 and an air outlet hole 43 are formed in the housing 40 near to the cutter 32. An suction pipe and a pneumatic pump for sucking air according to pneumatic pressure are connected to the air outlet hole 43. The air sucked by the air inlet hole 42 is externally discharged through the air outlet hole 43. Dust of sheath of the wire W removed by the cutter 32 is externally discharged through the air outlet hole 43 with the air.

Operations of the wire stripper according to the current embodiment of the present invention will now be described.

First, the wire W is inserted into the housing 40 through the inserting hole 41. The lever 31 slants in such a way that the lever 31 is farther from the central axis line C of the main shaft 10 near the inserting hole 41. Accordingly, each cutter 32 of the three cutting members 30 is spread from each other. The wire W is inserted with respect to the housing 40, between the cutters 32 up to a location contacting the slide shaft 50.

At this time, the rotating unit 20 is operated. The motor 21 rotates, and accordingly, the driving pulley 22 is rotated. The driven pulley 24 connected to the driving pulley 22 by the belt 23 is also rotated, and thus the main shaft 10 is rotated. The three cutting members 30 installed at the main shaft 10 are rotated with respect to the central axis line C of the main shaft 10. When a rotating speed of the main shaft 10 gradually increases, each cutting member 30 is slanted while rotating with respect to the hinge shaft 13 to a direction the cutters 32 approach each other. As described above, the cutting member 30 is heavier at a side where the weight 33 is disposed than a side where the cutter 32 is disposed, from the hinge shaft 13, due to the weight 33. Accordingly, a centrifugal force at the side where the weight 33 is disposed is higher than a centrifugal force at the side where the cutter 32 is disposed, in the cutting member 30. When the centrifugal force on the weight 33 gradually increases as the rotating speed of the main shaft 10 increases, the centrifugal force overcomes the elastic force of the elastic member 60, and acts in a direction opposite to the elastic force. Accordingly, the lever 31 rotates with respect to the hinge shaft 13 while the cutters 32 approach each other, and the cutters 32 contacts the wire W disposed among the cutters 32. The cutter 32 formed of an artificial diamond contacts the wire W while quickly rotating, thereby peeling off the sheath of the wire W. When a user pulls the holder 80 away from the wire W, the sheath of the wire W is peeled off by the cutter 32, and the wire W slips through the inserting hole 41 of the housing 40.

Here, when air is sucked in a vacuum through the air outlet hole 43 of the housing 40, dust of the sheath is discharged to the outside of the housing 40 through the air outlet hole 43 with the air sucked through the air inlet hole 42.

As described above, while removing the sheath of the wire W, only the sheath may be removed without peeling off a metal part of the wire W. Sometimes, a surface of the metal part of the wire W may not be smooth but uneven, and the wire stripper according to the current embodiment of the present invention may prevent the metal part of the wire W from being peeled off. As described above, since the cutting member 30 is installed to freely rotate with respect to the hinge shaft 13, when a protruding part of the metal part of the wire W and the cutter 32 contact each other, the cutting member 30 rotates with respect to the hinge shaft 13 while the cutter 32 moves away from the wire W. Here, the elastic force of the elastic member 60 helps such motions of the cutting member 30 for shock absorbing action. In other words, the cutters 32 peel off the sheath formed of a synthetic resin or synthetic paint having relatively low rigidity, and do not cut off the metal part of the wire W, which have relatively high rigidity.

Meanwhile, the diameter adjuster 51 of the slide shaft 50 also prevents the metal part of the wire W from being cut off. When the cutters 32 gradually approach the central axis line while peeling off the sheath of the wire, the diameter adjuster 51 of the slide shaft 50 is caught at the incline 311 of the lever 31, and thus the cutters 32 are prevented from being approaching the wire W. According to an interaction of the diameter adjuster 51 and the slide shaft 50, only the sheath of the wire W may be peeled off.

When a thickness of the wire W is changed, a degree of peeling off the sheath may be adjusted as follows. First, when the fixing bolt 75 is somewhat unfastened, the slide shaft 50 and the main shaft 10 may relatively rotate. When the knob 72 is rotated, the location fixing unit 73 and the slide shaft 50 rotate while the main shaft 10 and the fixed body 71 are stationary. Since the knob 72 and the fixed body 71 are screwed to each other, the slide shaft 50 moves forward or backward with respect to the main shaft 10 according to a rotating direction of the knob 72. When the slide shaft 50 moves forward with respect to the main shaft 10, the diameter adjuster 51 pushes the incline 311, and thus a space among the cutters 32 is widened. When the slide shaft 50 moves backward with respect to the main shaft 10, the diameter adjuster 51 moves backward along the incline 311, and thus the space among the cutters 32 is narrowed. Such a method of adjusting a diameter may be performed in an opposite manner based on an incline direction of the incline 311. When the location of the diameter adjuster 41 is adjusted based on the thickness of the wire W, the fixing bolt 75 is fastened again. The fixing bolt 75 is fastened to the slide shaft 50 through the main shaft 10, so as to prevent a relative rotation of the main shaft 10 and the slide shaft 50. Accordingly, the main shaft 10, the slide shaft 50, the fixed body 71, the knob 72, and the location fixing nut 73 rotate together.

A wire stripper of the present invention quickly and effectively performs an operation of removing a sheath of a wire.

Also, the wire stripper removes only a required sheath of the wire.

While the present invention has been particularly shown and described with reference to exemplary embodiments thereof, it will be understood by those of ordinary skill in the art that various changes in form and details may be made therein without departing from the spirit and scope of the present invention as defined by the following claims.

For example, the rotating unit 20 includes the motor 21, the driving pulley 22, the driven pulley 24, and the belt 23, but a rotating unit having another structure may be used. A solenoid or a coil may be directly installed to a main shaft so that the main shaft rotates in the same manner as a motor.

Also, the three cutting members 30 are installed at the main shaft 10 at regular angle intervals of 120°, but a number and angle intervals of cutting members may differ as occasion demands.

Also, the elastic member 60 provides the elastic force by being disposed between the ring 14 of the main shaft 10 and the cutting member 30, but an elastic member may provide an elastic force to a cutting member, in any location and any method.

Also, the air inlet hole 42 and the air outlet hole 43 are installed at the housing 40, and the air is sucked through the air outlet hole 43, but according to circumstances, the housing 40 may not include the air inlet hole 42 and the air outlet hole 43. Specifically, if a wire stripper is manufactured to be portable, a housing may not include an air inlet hole and an air outlet hole.

Also, a method of adjusting a diameter of a wire by using a diameter adjusting unit may be changed according to a location and an incline direction of an incline of a lever.

In addition, the diameter adjusting unit may adjust the diameter of the wire while moving a slide shaft forward or backward with respect to a main shaft, by using units other than the fixed body 71 and the knob 72.

Meanwhile, a size of an inserting hole formed in a housing may be configured to change according to a thickness of a wire.

What is claimed is:
1. A wire stripper for peeling off a sheath of a wire, the wire stripper comprising;
  a main shaft;
  a rotating unit for rotating the main shaft;
  a cutting member comprising a lever that is disposed parallel to the main shaft and is hinged to the main shaft so as to rotate with respect to a hinge shaft perpendicular to the main shaft, a cutter that is combined to the lever in such a way that the cutter peels off the sheath of the wire collinearly disposed with the main shaft while the main shaft is rotated, and a weight combined to the lever so that a location opposite to where the cutter is located with respect to a rotating axis of the lever is heavier; and
  a housing comprising an inserting hole through which the wire is inserted and guided to the cutter of the cutting member, and accommodating the cutting member and at least a part of the main shaft;
  further comprising an elastic member that is disposed between the main shaft and the cutting member, and providing an elastic force to the cutting member so that the cutting member rotates in such a way that the cutter moves farther from a center axis line of the main shaft;
  wherein a plurality of the cutting members are prepared and the number of elastic members prepared is the same as the number of the plurality of cutting members;
  wherein the plurality of cutting members are disposed at regular angle intervals along a circumferential direction with respect to the main shaft;
  wherein the lever of the cutting member has an incline,
  a through hole penetrating a center of the main shaft in a length direction is formed in the main shaft, and
  the wire stripper further comprising a slide shaft, which is inserted into and installed in the through hole of the main shaft and comprises a diameter adjuster that limits a nearest distance of the cutter to the wire by contacting the incline of the lever according to a relative location to the main shaft.

2. The wire stripper of claim 1, further comprising a diameter adjusting unit that comprises a fixed body combined to the main shaft, and a knob screwed to the fixed body and combined to the slide shaft.

3. A wire stripper for peeling off a sheath of a wire, the wire stripper comprising:
- a main shalt;
- a rotating unit for rotating the main shaft;
- a cutting member comprising a lever that is disposed parallel to the main shaft and is hinged to the main shaft so as to rotate with respect to a hinge shaft perpendicular to the main shaft, a cutter that is combined to the lever in such a way that the cutter peels off the sheath of the wire collinearly disposed with the main shaft while the main shaft is rotated, and a weight combined to the lever so that a location opposite to where the cutter is located with respect to a rotating axis of the lever is heavier; and
- a housing comprising an inserting hole through which the wire is inserted and guided to the cutter of the cutting member, and accommodating the cutting member and at least a part of the main shaft;
- wherein the housing comprises an air inlet hole and an air outlet hole for discharging sheath dust of the wire according to pneumatic pressure.

4. The wire stripper of claim 3, wherein the lever and the weight of the cutting member are integrally formed as one body.

5. The wire stripper of claim 3, wherein the rotating unit comprises a motor, a driving pulley combined to the motor, a driven pulley combined to the main shaft, and a belt connecting the driving pulley and the driven pulley.

6. The wire stripper of claim 3, wherein the cutter of the cutting member is formed of an artificial diamond.

* * * * *